United States Patent [19]

Shuto et al.

[11] Patent Number: 5,977,347
[45] Date of Patent: *Nov. 2, 1999

[54] CELLULOSE ACETATE PROPIONATE

[75] Inventors: Yuichiro Shuto; Hiroki Taniguchi, both of Hyogo, Japan

[73] Assignee: Daicel Chemical Industries, Ltd., Osaka, Japan

[*] Notice: This patent is subject to a terminal disclaimer.

[21] Appl. No.: 09/187,634

[22] Filed: Nov. 6, 1998

Related U.S. Application Data

[63] Continuation-in-part of application No. 08/902,888, Jul. 30, 1997, Pat. No. 5,856,468.

[30] Foreign Application Priority Data

Jul. 30, 1996 [JP] Japan ..................................... 8-216671

[51] Int. Cl.$^6$ ....................................................... C08B 3/16
[52] U.S. Cl. ................................................. 536/64; 536/65
[58] Field of Search .................................. 536/58, 64, 65

[56] References Cited

U.S. PATENT DOCUMENTS 5,219,510  6/1993  Machell et al. .
5,288,715  2/1994  Machell et al. .
5,856,468  1/1999  Shuto et al. .................................. 536/64

OTHER PUBLICATIONS

C.J.Malm, et al (Eastman Kodak Co.) "Aliphatic Acid Esters of Cellulose" pp. 688–691, Industrial and Engineering Chemistry, vol. 43, No.3 (1951).
A Catalogue of Eastman, Cellulose Esters, Jun./1994, Publication E–146L.

*Primary Examiner*—Nathan M. Nutter
*Attorney, Agent, or Firm*—McAulay Nissen Goldberg Kiel & Hand, LLP

[57] ABSTRACT

Cellulose acetate propionate is a cellulose ester wherein hydroxyl groups of cellulose are substituted with acetyl and propionyl. Cellulose acetate propionate of the present invention has an amorphous index (Am) of 0.01 to 0.10. The present invention also provides cellulose acetate propionate having a degree of acetyl substitution (DSac) and a degree of propionyl substitution (DSpr) satisfying the formulas (I) to (IV).

$$2.0 < DSac \leq 2.95 \quad (I)$$

$$0.05 < DSpr \leq 0.8 \quad (II)$$

$$2.6 < DSac + DSpr \leq 3.0 \quad (III)$$

$$1.9 < DSac - DSpr \quad (IV)$$

8 Claims, 4 Drawing Sheets

CELLULOSE ACETATE PROPIONATE

CROSS-REFERENCE TO RELATED APPLICATION

This is a continuation-in-part application of U.S. patent application Ser. No. 08/902,888 filed on Jul. 30, 1997 and now U.S. Pat. No. 5,856,468.

FIELD OF THE INVENTION

The present invention relates to cellulose acetate propionate.

BACKGROUND OF THE INVENTION

A cellulose acetate, particularly cellulose triacetate has been used to prepare various plastic products, such as a film or a fiber because the cellulose acetate is excellent in dimensional stability and heat-resistance. A cellulose acetate film is a representative photogrpahic support. Further, the cellulose acetate film has an optical isotropy. Accordingly, the film is also used in a liquid crystal display device, which has recently extended its market. The cellulose acetate film is used as a protective film of a polarizing plate or a color filter in the liquid crystal display device.

A cellulose acetate product is prepared by using a solution (that is called "dope") or melt of cellulose acetate. For example, a cellulose acetate film is prepared according to a solvent cast method or a melt cast method. The solvent cast method comprises the steps of casting a solution of cellulose acetate in a solvent on a support, and evaporating the solvent to form a film. The melt cast method comprises the steps of casting molten cellulose acetate on a support under heating, and cooling it to form a film. The solvent cast method can form a highly flat film, compared with the melt cast method. Therefore, the solvent cast method is generally employed to give a cellulose acetate film.

The solvent used in the solvent cast method must have functions not only of dissolving the cellulose acetate but also of forming an excellent film. In more detail, the viscosity and the polymer concentration of the solution (dope) should be appropriately adjusted to form a flat plane film having a uniform thickness. The dope also should have enough stability. Further, the dope should easily be set to gel. Furthermore, the formed film should easily be peeled off the support. The most appropriate solvent must be selected to satisfy these requirements. Moreover, the solvent should be so easily evaporated that the solvent scarcely can remain in the film.

Various organic solvents have been proposed as the solvents of cellulose acetate. However, only methylene chloride satisfies all the above-mentioned requirements. Accordingly, solvents other than methylene chloride have not been practically used.

However, the use of hydrocarbon halides such as methylene chloride has recently been restricted severely to protect the global environmental conditions. Further, methylene chloride is apt to vaporize in the process for the preparation of the film, because it has a low boiling point (41° C.). Accordingly, methylene chloride may cause problems in the working environment. Therefore, the process is conducted under closed conditions. However, there is a technical limitation on sealing methylene chloride in a closed system.

By the way, acetone and methyl acetate are widely used organic solvents. Acetone and methyl acetate have an appropriate boiling point (56° C. and 57° C. respectively). The process of evaporating acetone or methyl acetate does not need a large thermal energy. Further, acetone and methyl acetate have few problems on the human body and the global environmental conditions, compared with the organic chloride solvents.

However, cellulose acetate has a poor solubility in acetone or methyl acetate. Cellulose triacetate having a degree of substitution of not more than 2.80 (acetic acid content: 60.1%) is slightly soluble in, and merely swelled in and acetone or methyl acetate.

C. J. Malm et al. report in Ind. Enig. Chem., 43 (1951) 688, that solvents for cellulose acetate are limited in number, compared with cellulose propionate or cellulose butyrate. Cellulose propionate or cellulose butyrate is soluble in a ketone or an ester, in which cellulose acetate is insoluble. However, cellulose propionate and cellulose butyrate films are inferior to a cellulose acetate film in the mechanical strength and the durability.

Cellulose acetate propionate and cellulose acetate butyrate are commercially available. For example, a catalogue of Eastman (June 1994) shows various cellulose acetate propionates and cellulose acetate butyrates, most of which are soluble in widely used organic solvents such as acetone and methyl acetate. However, cellulose acetate propionate and cellulose acetate butyrate films are still inferior to a cellulose acetate film in the mechanical strength and the durability. The cellulose acetate propionate shown in the catalogue is not used in a protective film or a photographic support (which requires a high mechanical strength), but is used in printing inks.

Japanese Patent Provisional Publication No. 6(1994)-501040 proposes a melt casting method in place of the solvent casting method having the problems mentioned above. However, the melt casting method has another problem that the melting point of cellulose triacetate is higher than the decomposition point. If cellulose triacetate, which has a high degree of acetyl substitution, is heated, it would be decomposed before melted. The invention in the publication adjusts the degree of acetyl substitution in the range of 1.9 to 2.6 to solve the problem of decomposition. The publication further discloses cellulose acetate propionate having a degree of propionyl substitution in the range of 0 to 0.9. In the Example B of the publication, cellulose acetate propionate has the degree of acetyl substitution of 1.90 and the degree of propionyl substitution of 0.71. In the Example C of the publication, cellulose acetate propionate has the degree of acetyl substitution of 2.10 and the degree of propionyl substitution of 0.50.

SUMMARY OF THE INVENTION

The present inventors studied cellulose acetate propionate. Cellulose acetate (particularly cellulose triacetate) has a problem that solvents for cellulose acetate are limited in number. The problem can be solved by using cellulose propionate or cellulose acetate propionate in place of cellulose acetate, as is described in the report of C. J. Malm et al. or the catalogue of Eastman. Cellulose propionate or cellulose acetate propionate is inferior to cellulose triacetate in the physical properties. Cellulose acetate propionate disclosed in Japanese Patent Provisional Publication No. 6(1994)-501040 also has a problem in the physical properties.

The present inventors have further studied cellulose acetate propionate, and found that the known cellulose acetate propionate has a low degree of crystallinity. Therefore, a film made of the known cellulose acetate propionate is soft and has a low mechanical strength.

An object of the present invention is to provide cellulose acetate propionate that is soluble in various organic solvents, and has physical properties as the same as or better than those of cellulose triacetate.

The present invention provides cellulose acetate propionate having an amorphous index (Am) of 0.01 to 0.10 defined in the following formula:

$$Am = \frac{0.5 \times \{I(2\theta = 5°) + I(2\theta = 14.5°)\}}{\sum_{i=1}^{n} Pi}$$

in which I(2θ=5°) and I(2θ=14.5°) mean X-ray scattering intensities where Bragg angles (2θ) are 5° and 14.5° respectively, which are obtained by forming a film of 100 μm thick from a cellulose acetate propionate solution, treating the film at 200° C. for 60 minutes and measuring X-ray diffraction of the film; n means the number of peaks observed in X-ray scattering intensity curve within the range of 5° to 14.5° of Bragg angles (2θ) in the measurement of the film; and Pi means X-ray scattering intensity at the peak number i in the measurement of the film.

The invention also provides cellulose acetate propionate having a degree of acetyl substitution (DSac) and a degree of propionyl substitution (DSpr) satisfying the formulas (I) to (IV).

| | |
|---|---|
| 2.0<DSac≦2.95 | (I) |
| 0.05<DSpr≦0.8 | (II) |
| 2.6<DSac+DSpr≦3.0 | (III) |
| 1.9<DSac–DSpr | (IV) |

The cellulose acetate propionate of the present invention is soluble in widely used organic solvents other than hydrocarbon halides. Further, the cellulose acetate propionate of the invention has a high degree of crystallinity. Therefore, a product having excellent physical and optical properties can be formed from the cellulose acetate propionate without use of hydrocarbon halide organic solvents.

DETAILED DESCRIPTION OF THE INVENTION

[Definition of amorphous index]

The cellulose acetate propionate of the present invention is characterized in that the amorphous index (Am) is in the range of 0.01 to 0.10. The amourphous index is more preferably in the range of 0.05 to 0.10. The amorphous index (Am) is defined in the following formula.

$$Am = \frac{0.5 \times \{I(2\theta = 5°) + I(2\theta = 14.5°)\}}{\sum_{i=1}^{n} Pi}$$

In the formula, I(2θ=5°) and I(2θ=14.5°) mean X-ray scattering intensities where Bragg angles (2θ) are 5° and 14.5° respectively. The X-ray scattering intensities are obtained by forming a film of 100 μm thick from a cellulose acetate propionate solution, treating the film at 200° C. for 60 minutes and measuring X-ray diffraction of the film. In the formula, n means the number of peaks observed in X-ray scattering intensity curve within the range of 5° to 14.5° of Bragg angles (2θ) in the measurement of the film. Further, Pi means X-ray scattering intensity at the peak number i in the measurement of the film.

The measurement of the film is described in more detail.

First, cellulose acetate propionate is dissolved in a solvent to obtain a solution. A film of 100 μm thick is prepared according to a solvent casting method using the obtained cellulose acetate propionate solution. The film is then treated at 200° C. for 60 minutes to crystallize cellulose acetate propionate. The thermally treated film is pasted on an aluminum sample folder. The X-ray diffraction intensity curve of the film is obtained by a symmetric reflection method. The X-ray generator is a rotating anode type, and the X-ray source is Kα-ray of Cu. The X-ray is passed thorough a monochromator to use a monochromatic X-ray. The operations are conducted at the tube voltage of 40 kV and the tube current of 30 mA. The Bragg angle (2θ) of the measurement is in the range of 5° and 14.5°. The rotating speed of the goniometer is 2° (2θ) per minute. The obtained X-ray diffraction curve is not subjected to corrections about the air scattering, a Lorentz polarizing factor or the like. The fluctuations in the intensity curve are smoothed to obtain the scattering intensity.

Figure 1:
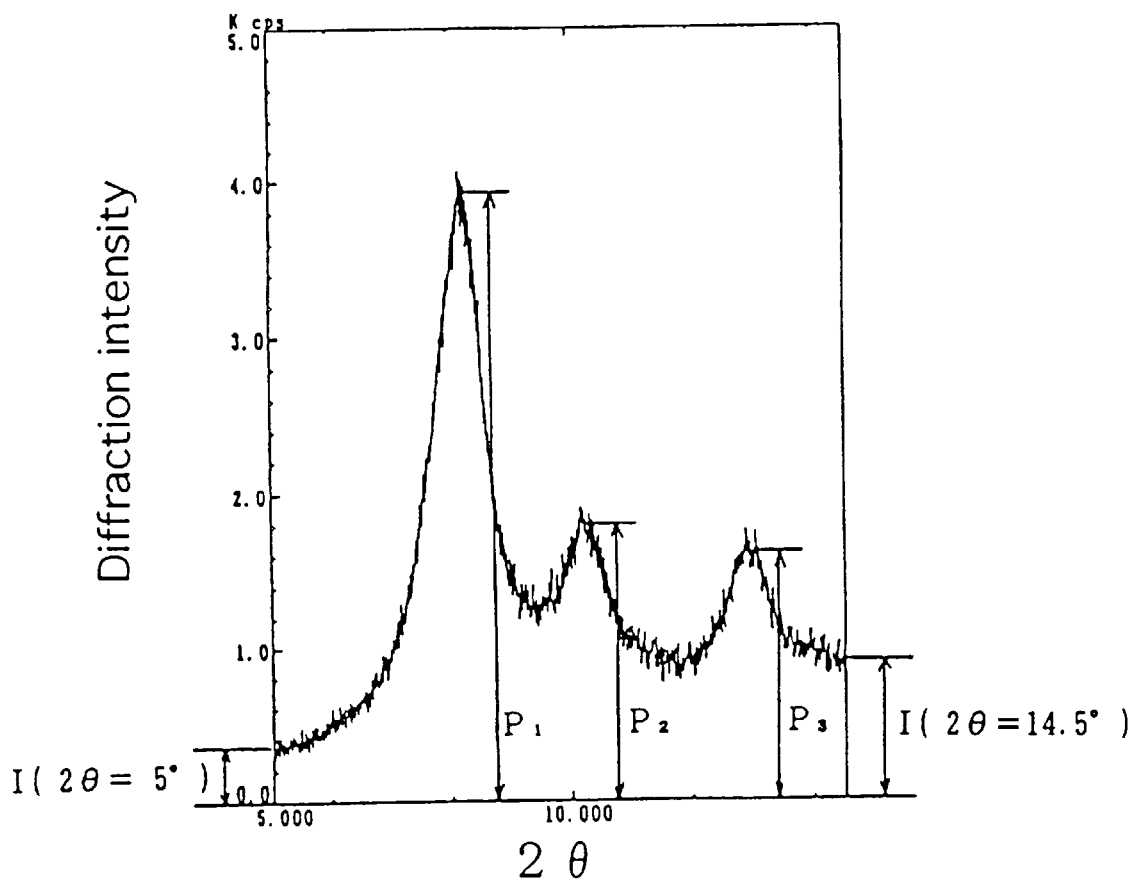
FIG. 1 is a graph showing the X-ray diffraction of the film prepared in Example 1 wherein the ordinate means the X-ray scattering intensity (Kcps) and the abscissa means Bragg angle (2θ).
Figure 2:
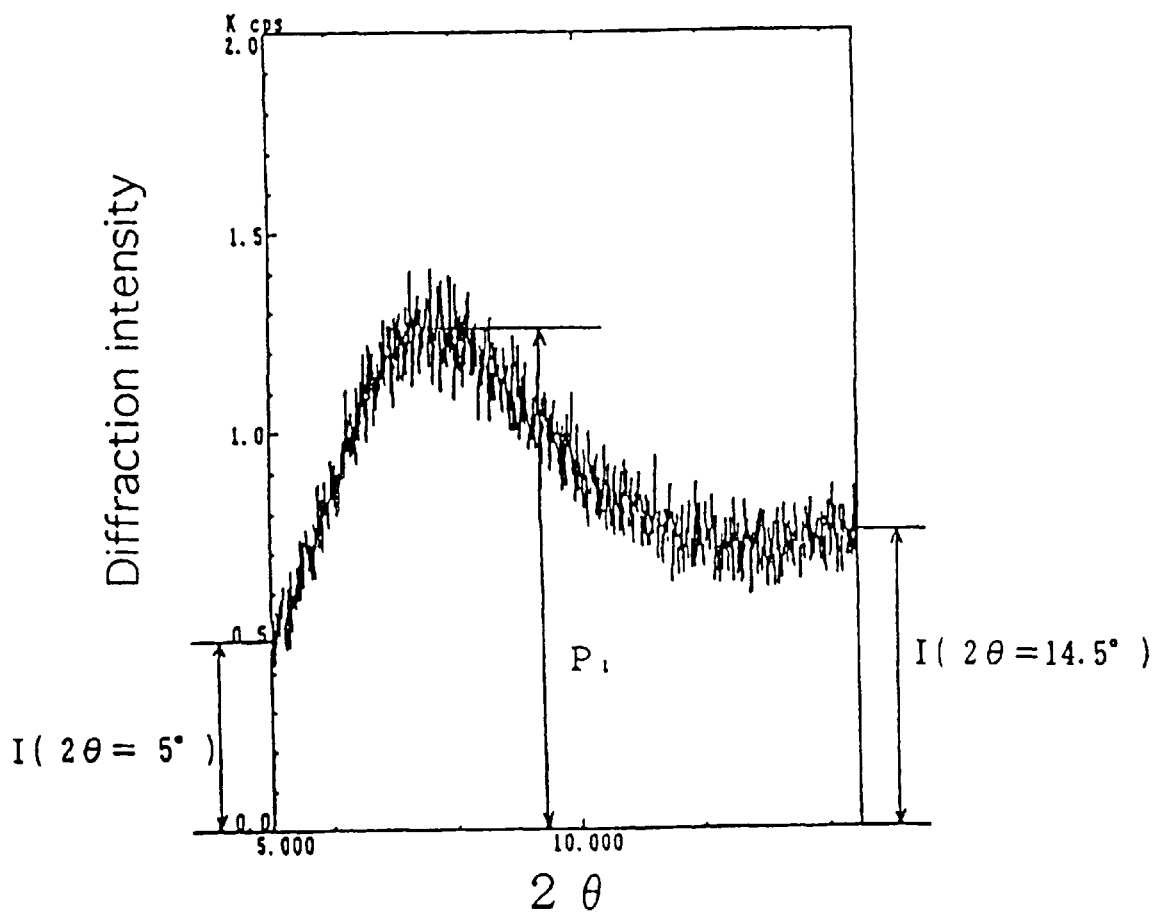
FIG. 2 is a graph showing the X-ray diffraction of the film prepared in Comparison example 1 wherein the ordinate means the X-ray scattering intensity (Kcps) and the abscissa means Bragg angle (2θ).
Figure 3:
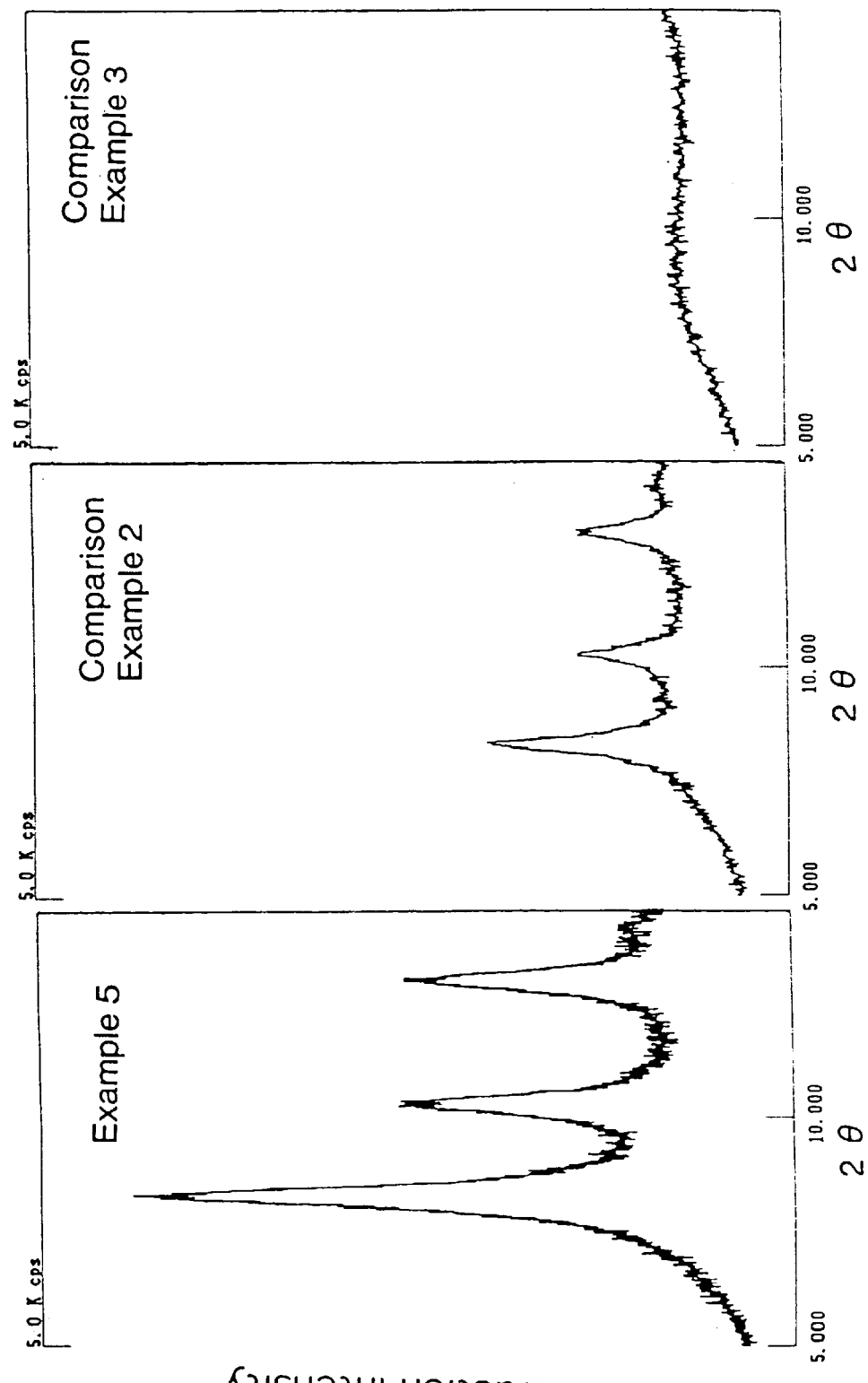
FIG. 3 is a graph showing the X-ray diffraction of the films prepared in Example 5 and Comparison examples 2 & 3 wherein the ordinate means the X-ray scattering intensity (Kcps) and the abscissa means Bragg angle (2θ).

The analysis of the X-ray diffraction intensity curve is described in more detail in Examples 1 & 5 and Comparison examples 1 to 3 referring to FIGS. 1 to 3.

[Degrees of substitution]

The cellulose acetate propionate preferably has a degree of acetyl substitution (DSac) and a degree of propionyl substitution (DSpr) satisfying the formulas (I) to (III).

| | |
|---|---|
| 2.0<DSac≦2.95 | (I) |
| 0.05<DSpr≦0.8 | (II) |
| 2.6<DSac+DSpr≦3.0 | (III) |

The cellulose acetate propionate more preferably satisfies the formula (IV) as well as the formulas (I) to (III).

| | |
|---|---|
| 1.9<DSac–DSpr | (IV) |

The cellulose acetate propionate further preferably satisfies the formula (IIIa) in place of the formula (III).

| | |
|---|---|
| 2.75<DSac+DSpr≦3.0 | (IIIa) |

Cellulose acetate propionate is a cellulose ester wherein some of three hydroxyl groups of a cellulose unit (glucose combined with β1-4 glycoside bond) are substituted with acetyl and propionyl. The degree of substitution means the ratio of substituted groups to the three hydroxyl groups of the cellulose unit. The degrees of substitution are calculated from combined fatty acid contents (based on one cellulose unit), which are measured according to ASTM, D-817-91 (Testing methods for cellulose acetate etc.).

The degree of substitution is described below referring to FIG. 4.

Figure 4:
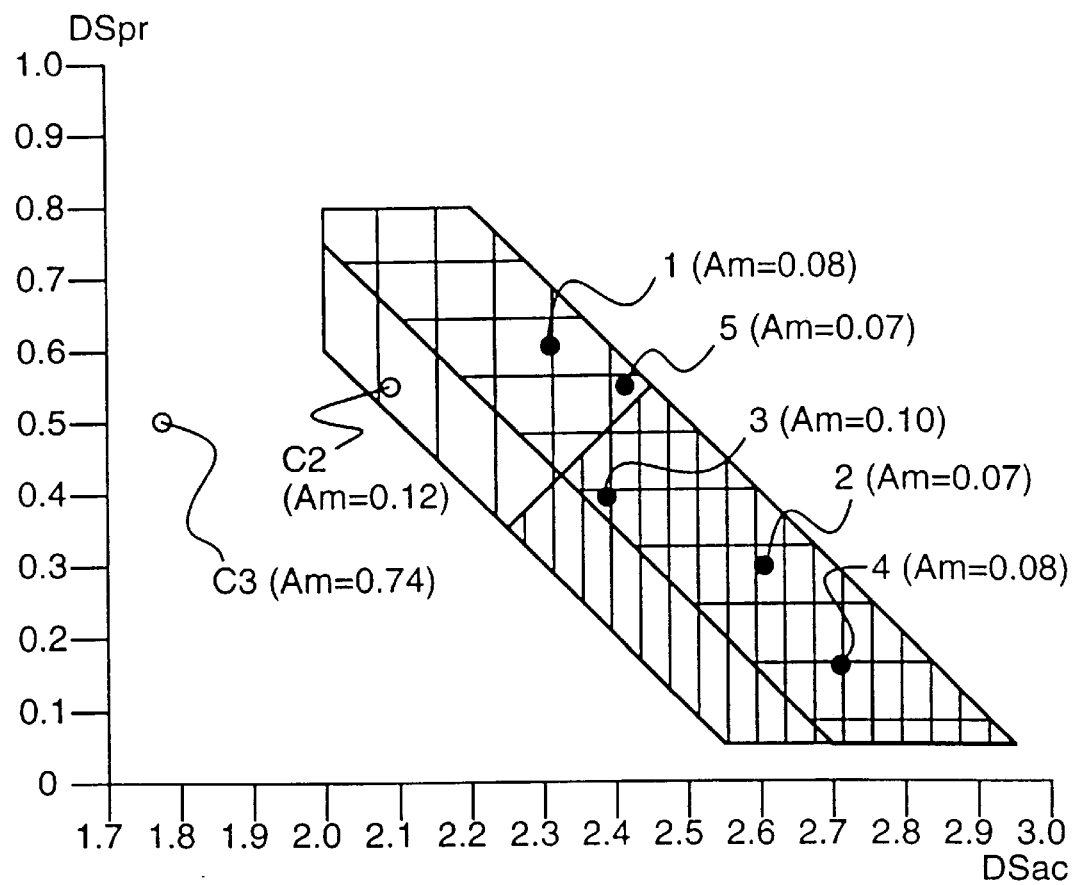
FIG. 4 is a graph wherein the ordinate means the degree of propionyl substitution (DSpr) and the abscissa means the degree of acetyl substitution (DSac).

FIG. 4 is a graph wherein the ordinate means the degree of propionyl substitution (DSpr) and the abscissa means the degree of acetyl substitution (DSac).

The numbers 1 to 5, C2 and C3 shown in FIG. 4 mean the cellulose acetate propionates used in Examples 1 to 5 and Comparison Examples 2 & 3 respectively.

If a degree of acetyl substitution is lower than, or a degree of propionyl substitution is higher than the range of the formulas (I), (II) and (III) (if a plotted point is arranged in left or upper side of the area hatched in FIG. 4), an interaction of the cellulose ester molecule is so weak that the mechanical strength of the formed film (elastic modulus, folding endurance) is degraded. If a degree of acetyl substitution is higher than, or a degree of propionyl substitution is lower than the range of the formulas (I), (II) and (III) (if a plotted point is arranged in right or lower side of the area hatched in FIG. 4), solubilities of the cellulose ester in various organic solvents are decreased.

Another acyl group or an ester group of an inorganic acid can be further attached to the cellulose acetate propionate so long as the degrees of the acetyl and propionyl substitutions included within the above-mentioned range. An example of another acyl group is butyryl. Examples of inorganic acids include nitric acid, sulfuric acid and phosphoric acid.

The cellulose acetate propionate has a weight average degree of polymerization preferably in the range of 350 to 800, and more preferably in the range of 370 to 600.

The cellulose acetate propionate has a number average molecular weight preferably in the range of 70,000 to 230,000, more preferably in the range of 75,000 to 230,000, and most preferably in the range of 78,000 to 120,000.

[Synthesis of cellulose acetate propionate]

Cellulose acetate propionate can be synthesized by using an acid anhydride or an acid chloride as an acylating agent. In the case that an acid anhydride is used as an acylating agent, an organic acid (e.g., acetic acid) or methylene chloride is used as a reaction solvent, and an acidic catalyst such as sulfuric acid is used. In the case that an acid chloride is used as an acylating agent, a basic compound is used as a catalyst. According to the most conventional industrial synthesizing method, cellulose is esterified with organic acids (acetic acid, propionic acid) or anhydrides thereof (acetic anhydride, propionic anhydride) corresponding to acetyl and propionyl groups to synthesize cellulose acetate propionate.

The amounts of acetylating and propionylating agents are so adjusted that the degrees of substitutions are included within the above-mentioned range. The amount of the reaction solvent is preferably in the range of 100 to 1,000 weight parts, more preferably in the range of 200 to 600 weight parts based on 100 weight parts of cellulose. The amount of the acidic catalyst is preferably in the range of 0.1 to 20 weight parts, and more preferably in the range of 0.4 to 10 weight parts based on 100 weight parts of cellulose.

The reaction temperature is preferably in the range of 10 to 120° C., and more preferably in the range of 20 to 80° C. Another acylating agent (e.g., butyrylating agent) or an esterifying agent (e.g., sulfuric esterifying agent) can be used in combination with the above-mentioned agents. If necessary, cellulose acetate propionate can be hydrolyzed (saponified) to adjust the degrees of substitutions after completing the acylating reaction.

After completing the reactions, the reaction mixture (cellulose ester dope) is separated according to a conventional method such as sedimentation. The separated material is washed and dried to obtain cellulose acetate propionate.

[Cellulose acetate propionate solution]

Cellulose acetate propionate is dissolved in a solvent to prepare a solution.

An organic solvent is preferred to an inorganic solvent. The cellulose acetate propionate of the present invention is soluble in various organic solvents. The solubility is improved by the present invention because a solubility parameter is changed by an effect of a random polymerization.

A solution of the cellulose acetate propionate of the present invention can be prepared without use of hydrocarbon chlorides such as methylene chloride, dichloroethane and chloroform. The amount of hydrocarbon chloride is preferably not more than 5 weight %, and more preferably not more than 3 weight % of the organic solvent. The organic solvent further preferably substantially does not contain hydrocarbon chloride, and most preferably completely does not contain hydrocarbon chloride.

Examples of the organic solvents include ketones (e.g., acetone, methyl ethyl ketone), nitro compounds (e.g., nitromethane, nitroethane), esters (e.g., methyl formate, ethyl formate, methyl acetate, ethyl acetate), amides (e.g., N,N-dimethylformamide, N-methylpyrrolidone), cyclic ethers (e.g., tetrahydrofuran, 1,3-dioxane, 1,4-dioxane, 1,3-dioxolane), cellosolves (e.g., methylcellosolve, ethylcellosolve, methylcellosolve acetate, ethylcellosolve acetate), nitriles (e.g., acetonitrile) and sulfoxides (e.g., dimethylsulfoxide). The cellulose acetate propionate of the present invention has a high solubility particularly in ketones such as acetone and esters such as methyl acetate, compared with cellulose triacetate. Two or more organic solvents can be used in combination. A lower alcohol having 1 to 4 carbon atoms (e.g., methanol, n-butanol) or cyclohexanone can be used in combination with the above-mentioned organic solvent.

A cellulose ester solution can be prepared in the same manner as in a conventional solvent casting method. The process and apparatus for the solvent casting method can be used in the preparation of the cellulose acetate propionate solution.

A solution of a relatively low concentration can be prepared by stirring a cellulose ester in a solvent at the room temperature. A solution of a relatively high concentration is preferably prepared by stirring the ester in the solvent while heating under a pressure. In more detail, cellulose acetate propionate and a solvent are placed in a pressure-resistant vessel, and sealed. The mixture is then stirred at a temperature of higher than the boiling point (at atmospheric pressure) of the solvent. The pressure is so adjusted that the solvent is not boiled in the vessel. The heating temperature is usually not lower than 60° C., and preferably in the range of 80 to 110° C.

After coarsely mixing components of the solution, the mixture can be placed in the vessel. Alternatively, each of the components can stepwise be introduced into the vessel in the order. A stirring device is preferably attached to the vessel. The pressure in the vessel can be increased by injecting an inactive gas such as nitrogen gas into the vessel. The pressure can also be increased by evaporation of the heated solvent. Further, the components can be introduced into the vessel by pressure after sealing the vessel.

A heating means is preferably arranged outside the vessel. For example, the vessel can be jacketed with a heating means. Further, a plate heater can be attached outside the vessel. A heated liquid is circulated in tube contained in the plate heater to heat the vessel.

A stirring wing is preferably arranged in the vessel to stir the mixture of cellulose acetate propionate in a solvent. The length of the wing is preferably adjusted to almost reach the inside wall of the vessel. A scratching wing is preferably attached at the end of the stirring wing to scratch a liquid membrane formed along the inside wall of the vessel.

Meters such as a thermometer and a manometer can be attached to the vessel. The components are dissolved in a solvent in the vessel. After cooling the prepared solution (dope), the solution is discharged from the vessel. Alternatively, the solution can be cooled after the solution is discharged from the vessel.

Even if cellulose acetate propionate is not sufficiently dissolved in an organic solvent according to the above-described conventional method (conducted at room temperature or an elevated temperature), cellulose acetate propionate can be dissolved in the solvent according to a cooling dissolution method. The cooling dissolution method comprises the steps of: mixing cellulose acetate propionate in an organic solvent; cooling the mixture to $-110°$ to $20°$ C.; warming the cooled mixture to $0°$ to $120°$ C. to dissolved the cellulose acetate propionate in the organic solvent.

At the first stage of cooling dissolution method, cellulose acetate propionate is gradually added to an organic solvent while stirring at room temperature. Cellulose acetate propionate is swelled with the organic solvent, but is not dissolved at this stage. The amount of cellulose acetate propionate is in the range of 10 to 40 wt. %, based on the amount of the mixture. The amount is preferably in the range of 10 to 30 wt. %. The other optional additives (described below) may be added to the organic solvent.

At the next stage, the mixture is cooled to a temperature of $-110°$ to $20°$ C. The mixture can be cooled in a dry ice/methanol bath ($-75°$ C.) or in a cooled diethylene glycol solution ($-30°$ to $-20°$ C.). At the cooling stage, the solvent permeates into the swelled cellulose acetate propionate (white clouds) to expel the air as bubbles from the mixture. The mixture turns colorless transparent.

Subsequently, the mixture is warmed to a temperature of $0°$ to $120°$ C. to dissolve the cellulose acetate propionate in the organic solvent. The mixture can be warmed by keeping it at room temperature. The mixture can also be warmed on a bath. Thus a dope is formed as a uniform solution. If cellulose acetate propionate is not sufficiently dissolved, the cooling and warming steps can be repeated. The dope is observed with eyes to determine whether cellulose acetate propionate is sufficiently dissolved or not.

A sealed vessel is preferably used in the cooling dissolution method to prevent contamination of water, which is caused by dew condensation at the cooling step. The time for the cooling and warming steps can be shortened by conducting the cooling step under a high pressure and conducting the warming step under a low pressure. A pressure vessel is preferably used under a high or low pressure.

The cooling dissolution method is described in U.S. Pat. No. 5,663,310 (Shimoda et al.) and U.S. Pat. No. 5,705,632 (Shimoda et al.).

The concentration of the solution is determined according to use of the solution. The solution contains cellulose acetate propionate usually in the range of 5 to 50 wt. %, and preferably in the range of 10 to 40 wt. %.

In the case that the solution is used to prepare a cellulose acetate propionate film, the solution has a viscosity preferably in the range of 10,000 to 1,000,000 cP.

Other additives (e.g., a plasticizer, inorganic powder, a stabilizer, a coloring agent, an antioxidizing agent, an antistatic agent, an ultraviolet absorbent, a flame retarder) can be added to the solution according to use of the solution.

A cellulose ester product usually contains a plasticizer to improve the physical property or to increase the drying speed. A phosphoric ester or a carboxylic ester is usually used as the plasticizer. Examples of the phosphoric esters include triphenyl phosphate and tricresyl phosphate. Representative carboxylic ester plasticizers are phthalic esters and citric esters. Examples of the phthalic esters include dimethyl phthalate, diethyl phthalate, dibutyl phthalate, dioctyl phthalate and diethylhexyl phthalate. Examples of the citric esters include acetyltriethyl citrate and acetyl triethyl citrate. Examples of the other carboxylic esters include butyl oleate, methyl acetyl ricinoleate, dibutyl sebacate, triacetin, triethylene glycol diacetate, triethylene glycol dipropionate and various trimellitic esters. Two or more plasticizers can be used in combination.

The amount of the plasticizer is usually in the range of 0.1 to 40 wt. % based on the amount of cellulose acetate propionate.

Examples of inorganic powders include kaolin, talc, diatomite, quartz, calcium carbonate, barium sulfate, titanium dioxide and alumina.

Examples of stabilizers include salts of alkaline earth metals (e.g., calcium, magnesium) and triphenyl phosphate.
[Cellulose acetate propionate film]

A cellulose acetate propionate film can be prepared according to a solvent casting method by using the cellulose acetate propionate solution. The solvent casting method is described in U.S. Pat. Nos. 2,336,310, 2,367,603, 2,492,077, 2,492,078, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

According to a conventional solvent casting method, a prepared cellulose ester solution (dope) is cast on a support (e.g., drum, band), and dried. The formed film is peeled from the support. The surface of the support is preferably polished to give a mirror plane.

The film is dried usually at a temperature in the range of 20 to 250° C. (preferably 30 to 200° C.) at atmospheric pressure or under a reduced pressure.

The thickness of the film is determined depending on use of the film. The thickness is usually in the range of 0.1 to 250 $\mu$m. An optical thin film for the protection of IC mask usually has a thickness in the range of 0.1 to 3 $\mu$m. A lapping film usually has a thickness in the range of 10 to 50 $\mu$m. Further, a photographic or optical film usually has a thickness in the range of 50 to 250 $\mu$m.
[Other cellulose acetate propionate products]

cellulose ester fibers can be prepared from the cellulose acetate propionate of the present invention. The cellulose ester fibers can be prepared according to a conventional method, for example by spinning fibers from the solution (dope) and removing the solvent from the fibers. The process of drying the fibers can be conducted in the same manner as in the above-mentioned process of drying the film. The cellulose ester fibers have a thickness preferably in the range of 1 to 16 deniers, more preferably in the range of 1 to 10 deniers, and most preferably in the range of 2 to 8 deniers. There is no specific limitation with respect to the sectional shapes of the fibers. Examples of the sectional shapes include a round shape, an oval shape, an irregular shape (e.g., the shapes of the letters Y, X, I or R) and a hollow shape.

The other various cellulose ester products can be prepared by using the cellulose acetate propionate of the present invention. The products can be prepared by using not only a solution (dope) or a melt of the cellulose acetate propionate but also cellulose acetate propionate particles. According to an extrusion or injection molding method, a product can be prepared from the cellulose acetate propionate particles.

In the preparation of the product, other cellulose esters can be used in combination with the cellulose acetate propionate of the present invention. Examples of the other cellulose esters include organic acid esters (e.g., cellulose acetate, cellulose propionate, cellulose butyrate) and inorganic acid esters (e.g., cellulose nitrate, cellulose sulfate, cellulose phosphate).

Products prepared by using the cellulose acetate propionate of the present invention are excellent in the mechanical strength and the optical property. The products are particularly excellent in the dynamic viscoelasticity. For example, the film of the present invention has a complex modulus or a storage modulus usually in the range of $2.8 \times 10^9$ to $8 \times 10^9$ (preferably in the range of $3 \times 10^9$ to $5 \times 10^9$). Further, the loss tangent (tan δ) is usually not more than 0.034 (preferably in the range of 0.02 to 0.034).

Because of the above-mentioned excellent physical properties, the cellulose acetate propionate of the present invention can advantageously be used to prepare a photogrpahic film or an optical film (e.g., a polarizing film), which severely requires excellent physical properties.

EXAMPLE 1

To 300 g of cellulose, 896 g of acetic acid and 203 g of propionic acid were added. The mixture was stirred at 54° C. for 30 minutes. After cooling the mixture, 419 g of acetic anhydride, 622 g of propionic anhydride, 10.6 g of sulfuric acid and 6.3 g of propionic acid (each of which was precooled at about −20° C.) were added to the mixture to initiate an esterifying reaction. The reaction was so controlled that the reaction temperature was not higher than 40° C. After the esterifying reaction was continued for 155 minutes, a mixture (reaction stopping agent) of 295 g of acetic acid and 98.5 g of water were added to the reaction mixture for 20 minutes to hydrolyze extra anhydrides. To the reaction mixture, 886 g of acetic acid and 295 g of water were added while keeping the temperature of the mixture at 60° C. After 1 hour, an aqueous solution of 17.0 g of magnesium acetate was added to the mixture to neutralize sulfuric acid in the mixture.

The obtained cellulose acetate propionate had the degree of acetyl substitution (DSac) of 2.31 and the degree of propionyl substitution (DSpr) of 0.61. The weight average degree of polymerization was 560, and the number average molecular weight was 88,900.

The cellulose acetate propionate was mixed with acetone, methyl acetate or chloroform at the room temperature. The cellulose acetate propionate was dissolved in each of the organic solvents to obtain a solution of 10 wt. % or more.

A 10 wt. % solution of the cellulose acetate propionate in chloroform was cast on a glass plate, and air-dried for 1 day. The formed film (thickness: 100 μm) was dried under vacuum at 80° C. for 4 hours. The film was heated at 200° C. for 60 minutes, and was subjected to the X-ray diffraction. The obtained X-ray diffraction is shown in FIG. 1. In FIG. 1, the ordinate means the X-ray scattering intensity (Kcps) and the abscissa means Bragg angle (2θ).

As is shown in FIG. 1, three peaks (P1, P2, P3) were observed within the Bragg angle (2θ) range of 5 to 14.5°. The amorphous index (Am) was calculated according to the formula.

$$Am = 0.5 \times \{I(2\theta=5°) + I(2\theta=14.5°)\} \div (P1+P2+P3) = 0.08$$

Further, the sample film (thickness: 100 μm) was cut into pieces of 2 mm width and 35 mm length. Both ends of the piece was fixed, and vibration was forced to the piece to measure distortion. The complex modulus, the storage modulus and the loss tangent (tan δ) were obtained from the relation between the stress and the distortion. The measurement was conducted by using a solid-state automatic viscoelasticity meter (RSA-II, Reometrix). At the measurement, the frequency was 10 Hz at 26° C.

The results are set forth in Table 1.

COMPARISON EXAMPLE 1

A commercially available cellulose acetate propionate (Cellidore, Bayer, DSac: 0.32, DSpr: 2.32) was dissolved in chloroform to prepare a 10 wt. % solution. The solution was cast on a glass plate, and air-dried for 1 day. The formed film (thickness: 100 μm) was dried under vacuum at 80° C. for 4 hours. The film was heated at 200° C. for 60 minutes, and was subjected to the X-ray diffraction. The obtained X-ray diffraction is shown in FIG. 2. In FIG. 2, the ordinate means the X-ray scattering intensity (Kcps) and the abscissa means Bragg angle (2θ).

As is shown in FIG. 2, one peak (P1) was observed within the Bragg angle (2θ) range of 5 to 14.5°. The amorphous index (Am) was calculated according to the formula.

$$Am = 0.5 \times \{I(2\theta=5°) + I(2\theta=14.5°)\} \div P1 = 0.50$$

Further, the complex modulus, the storage modulus and the loss tangent (tan δ) were obtained in the same manner as in Example 1.

The results are set forth in Table 1.

EXAMPLE 2

To 303 g of cellulose, 908 g of acetic acid and 200 g of propionic acid were added. The mixture was stirred at 54° C. for 30 minutes. After cooling the mixture, 701 g of acetic anhydride, 276 g of propionic anhydride, 10.6 g of sulfuric acid and 6.3 g of propionic acid (each of which was precooled at about −20° C.) were added to the mixture to initiate an esterifying reaction. The reaction was so controlled that the reaction temperature was not higher than 40° C. After the esterifying reaction was continued for 150 minutes, a mixture (reaction stopping agent) of 295 g of acetic acid and 98.5 g of water were added to the reaction mixture for 20 minutes to hydrolyze extra anhydrides. To the reaction mixture, 886 g of acetic acid and 295 g of water were added while keeping the temperature of the mixture at 60° C. After 1 hour, an aqueous solution of 17.0 g of magnesium acetate was added to the mixture to neutralize sulfuric acid in the mixture.

The obtained cellulose acetate propionate had the degree of acetyl substitution (DSac) of 2.60 and the degree of propionyl substitution (DSpr) of 0.30. The weight average degree of polymerization was 520, and the number average molecular weight was 75,800.

The cellulose acetate propionate was mixed with acetone, methyl acetate or chloroform at the room temperature. The cellulose acetate propionate was dissolved in each of the organic solvents to obtain a solution of 10 wt. % or more.

Further, the complex modulus, the storage modulus and the loss tangent (tan δ) were obtained in the same manner as in Example 1.

The results are set forth in Table 1.

EXAMPLE 3

To 303 g of cellulose, 881 g of acetic acid and 203 g of propionic acid were added. The mixture was stirred at 54° C. for 30 minutes. After cooling the mixture, 605 g of acetic anhydride, 400 g of propionic anhydride, 10.6 g of sulfuric acid and 6.3 g of propionic acid (each of which was precooled at about −20° C.) were added to the mixture to initiate an esterifying reaction. The reaction was so controlled that the reaction temperature was not higher than 40° C. After the esterifying reaction was continued for 140 minutes, a mixture (reaction stopping agent) of 295 g of acetic acid and 98.5 g of water were added to the reaction mixture for 20 minutes to hydrolyze extra anhydrides. To the reaction mixture, 886 g of acetic acid and 295 g of water were added while keeping the temperature of the mixture at 80° C. After 40 minutes, an aqueous solution of 17.0 g of magnesium acetate was added to the mixture to neutralize sulfuric acid in the mixture.

The obtained cellulose acetate propionate had the degree of acetyl substitution (DSac) of 2.38 and the degree of propionyl substitution (DSpr) of 0.39. The weight average degree of polymerization was 541, and the number average molecular weight was 83,800.

The cellulose acetate propionate was mixed with acetone, methyl acetate or chloroform at the room temperature. The cellulose acetate propionate was dissolved in each of the organic solvents to obtain a solution of 10 wt. % or more.

Further, the complex modulus, the storage modulus and the loss tangent (tan δ) were obtained in the same manner as in Example 1.

The results are set forth in Table 1.

EXAMPLE 4

To 301 g of cellulose, 753 g of acetic acid and 331 g of propionic acid were added. The mixture was stirred at 54° C. for 30 minutes. After cooling the mixture, 919 g of acetic anhydride, 10.6 g of sulfuric acid and 6.3 g of propionic acid (each of which was precooled at about −20° C.) were added to the mixture to initiate an esterifying reaction. The reaction was so controlled that the reaction temperature was not higher than 40° C. After the esterifying reaction was continued for 140 minutes, a mixture (reaction stopping agent) of 295 g of acetic acid and 98.5 g of water were added to the reaction mixture for 20 minutes to hydrolyze extra anhydrides. To the reaction mixture, 886 g of acetic acid and 295 g of water were added while keeping the temperature of the mixture at 80° C. After 1 hour, an aqueous solution of 17.0 g of magnesium acetate was added to the mixture to neutralize sulfuric acid in the mixture.

The obtained cellulose acetate propionate had the degree of acetyl substitution (DSac) of 2.71 and the degree of propionyl substitution (DSpr) of 0.17. The weight average degree of polymerization was 602, and the number average molecular weight was 83,400.

The cellulose acetate propionate was mixed with acetone, methyl acetate or chloroform at the room temperature. The cellulose acetate propionate was dissolved in each of the organic solvents to obtain a solution of 10 wt. % or more.

Further, the complex modulus, the storage modulus and the loss tangent (tan δ) were obtained in the same manner as in Example 1.

The results are set forth in Table 1.

EXAMPLE 5

Cellulose acetate propionate having the degree of acetyl substitution (DSac) of 2.42 and the degree of propionyl substitution (DSpr) of 0.56 was synthesized.

The cellulose acetate propionate was mixed with acetone, methyl acetate or chloroform at the room temperature. The cellulose acetate propionate was dissolved in each of the organic solvents to obtain a solution of 10 wt. % or more.

A 10 wt. % solution of the cellulose acetate propionate in chloroform was cast on a glass plate, and air-dried for 1 day. The formed film (thickness: 100 μm) was dried under vacuum at 80° C. for 4 hours. The film was heated at 200° C. for 60 minutes, and was subjected to the X-ray diffraction. The obtained X-ray diffraction is shown in FIG. 3. In FIG. 3, the ordinate means the X-ray scattering intensity (Kcps) and the abscissa means Bragg angle (2θ).

As is shown in FIG. 3, three peaks were observed within the Bragg angle (2θ) range of 5 to 14.5°. The amorphous index (Am) was calculated according to the formula.

$$Am=0.5\times\{I(2\theta=5°)+I(2\theta=14.5°)\}\div(P1+P2+P3)=0.07$$

Further, the complex modulus, the storage modulus and the loss tangent (tan δ) were obtained in the same manner as in Example 1.

The results are set forth in Table 1.

COMPARISON EXAMPLE 1

Cellulose acetate propionate having the degree of acetyl substitution (DSac) of 2.08 and the degree of propionyl substitution (DSpr) of 0.56 was synthesized.

The cellulose acetate propionate was mixed with acetone, methyl acetate or chloroform at the room temperature. The cellulose acetate propionate was dissolved in each of the organic solvents to obtain a solution of 10 wt. % or more.

A 10 wt. % solution of the cellulose acetate propionate in chloroform was cast on a glass plate, and air-dried for 1 day. The formed film (thickness: 100 μm) was dried under vacuum at 80° C. for 4 hours. The film was heated at 200° C for 60 minutes, and was subjected to the X-ray diffraction. The obtained X-ray diffraction is shown in FIG. 3. In FIG. 3, the ordinate means the X-ray scattering intensity (Kcps) and the abscissa means Bragg angle (2θ).

As is shown in FIG. 3, three peaks were observed within the Bragg angle (2θ) range of 5 to 14.5°. The amorphous index (Am) was calculated according to the formula.

$$Am=0.5\times\{I(2\theta=5°)+I(2\theta=14.5°)\}\div(P1+P2+P3)=0.12$$

Further, the complex modulus, the storage modulus and the loss tangent (tan δ) were obtained in the same manner as in Example 1.

The results are set forth in Table 1.

COMPARISON EXAMPLE 2

Cellulose acetate propionate having the degree of acetyl substitution (DSac) of 1.77 and the degree of propionyl substitution (DSpr) of 0.51 was synthesized.

The cellulose acetate propionate was mixed with cetone, methyl acetate or chloroform at the room temperature. The cellulose acetate propionate was dissolved in each of the organic solvents to obtain a solution of 10 wt. % or more.

A 10 wt. % solution of the cellulose acetate propionate in chloroform was cast on a glass plate, and air-dried for 1 day. The formed film (thickness: 100 μm) was dried under vacuum at 80° C. for 4 hours. The film was heated at 200° C. for 60 minutes, and was subjected to the X-ray diffraction. The obtained X-ray diffraction is shown in FIG. 3. In FIG. 3, the ordinate means the X-ray scattering intensity (Kcps) and the abscissa means Bragg angle (2θ).

The amorphous index (Am) was calculated according to the formula.

$$Am = 0.5 \times \{I(2\theta=5°) + I(2\theta=14.5°)\} \div \Sigma Pi = 0.12$$

Further, the complex modulus, the storage modulus and the loss tangent (tan δ) were obtained in the same manner as in Example 1.

The results are set forth in Table 1.

TABLE 1

| Sample No. | Degree of substitution | | Amorphous index | Elastic modulus ($\times 10^{-9}$ Pa) | | Loss tangent (tan δ) |
|---|---|---|---|---|---|---|
| | DSac | DSpr | | Complex | Storage | |
| Ex. 1 | 2.31 | 0.61 | 0.08 | 3.23 | 3.23 | 0.031 |
| Comp. 1 | 0.32 | 2.32 | 0.50 | 2.56 | 2.56 | 0.036 |
| Ex. 2 | 2.61 | 0.30 | 0.07 | 3.26 | 3.26 | 0.029 |
| Ex. 3 | 2.38 | 0.39 | 0.10 | 3.24 | 3.24 | 0.031 |
| Ex. 4 | 2.71 | 0.17 | 0.08 | 3.94 | 3.94 | 0.030 |
| Ex. 5 | 2.42 | 0.56 | 0.07 | 4.06, | 4.05 | 0.029 |
| Comp. 2 | 2.08 | 0.56 | 0.12 | 3.06 | 3.05 | 0.037 |
| Comp. 3 | 1.77 | 0.51 | 0.74 | 2.98 | 2.97 | 0.042 |

As is evident from the results shown in Table 1, the films prepared according to the present invention have a high elasticity and a low loss tangent (tan δ) and compared with the film of the comparative sample. The results mean that the films prepared according to the invention are hard, and have excellent mechanical properties.

We claim:

1. Cellulose acetate propionate having an amorphous index (Am) of 0.01 to 0.10 defined in the following formula:

$$Am = \frac{0.5 \times \{I(2\theta = 5°) + I(2\theta = 14.5°)\}}{\sum_{i=1}^{n} Pi}$$

in which I(2θ=5°) and I(2θ=14.5°) mean X-ray scattering intensities where Bragg angles (2θ) are 5° and 14.5° respectively, which are obtained by forming a film of 100 μm thick from a cellulose acetate propionate solution, treating the film at 200° C. for 60 minutes and measuring X-ray diffraction of the film; n means the number of peaks observed in X-ray scattering intensity curve within the range of 5° to 14.5° of Bragg angles (2θ) in the measurement of the film; and Pi means X-ray scattering intensity at the peak number i in the measurement of the film.

2. The cellulose acetate propionate as claimed in claim 1, wherein the amorphous index (Am) is in the range of 0.05 to 0.10.

3. The cellulose acetate propionate as claimed in claim 1, wherein the cellulose acetate propionate has a degree of acetyl substitution (DSac) and a degree of propionyl substitution (DSpr) satisfying the formulas (I) to (III).

$$2.0 < DSac \leq 2.95 \quad (I)$$

$$0.05 < DSpr \leq 0.8 \quad (II)$$

$$2.6 < DSac + DSpr \leq 3.0 \quad (III).$$

4. The cellulose acetate propionate as claimed in claim 1, wherein the cellulose acetate propionate has a weight average degree of polymerization in the range of 350 to 800.

5. The cellulose acetate propionate as claimed in claim 1, wherein the cellulose acetate propionate has a number average molecular weight in the range of 70,000 to 230,000.

6. The cellulose acetate propionate as claimed in claim 1, wherein the cellulose acetate propionate has a degree of acetyl substitution (DSac) and a degree of propionyl substitution (DSpr) satisfying the formula (IIIa).

$$2.75 < DSac + DSpr \leq 3.0 \quad (IIIa)$$

7. Cellulose acetate propionate having a degree of acetyl substitution (DSac) and a degree of propionyl substitution (DSpr) satisfying the formulas (I) to (IV).

$$2.0 < DSac \leq 2.95 \quad (I)$$

$$0.05 < DSpr \leq 0.8 \quad (II)$$

$$2.6 < DSac + DSpr \leq 3.0 \quad (III)$$

$$1.9 < DSac - DSpr \quad (IV)$$

8. The cellulose acetate propionate as claimed in claim 7, wherein the cellulose acetate propionate having a degree of acetyl substitution (DSac) and a degree of propionyl substitution (DSpr) satisfying the formula (IIIa).

$$2.75 < DSac + DSpr \leq 3.0 \quad (IIIa)$$

* * * * *